(12) United States Patent
Yamada et al.

(10) Patent No.: US 8,707,202 B2
(45) Date of Patent: Apr. 22, 2014

(54) INFORMATION PROCESSING DEVICE AND PROGRAM FOR DISPLAY AND USE OF MULTIPLE WINDOWS

(75) Inventors: Kazuhiro Yamada, Tokyo (JP); Eiju Yamada, Tokyo (JP); Dai Kamiya, Tokyo (JP); Izua Kano, Tokyo (JP); Keiichi Murakami, Tokyo (JP); Yasushi Onda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 429 days.

(21) Appl. No.: 12/811,883

(22) PCT Filed: Dec. 22, 2008

(86) PCT No.: PCT/JP2008/073339
§ 371 (c)(1),
(2), (4) Date: Sep. 9, 2010

(87) PCT Pub. No.: WO2009/087890
PCT Pub. Date: Jul. 16, 2009

(65) Prior Publication Data
US 2011/0004843 A1  Jan. 6, 2011

(30) Foreign Application Priority Data
Jan. 7, 2008 (JP) .................................. 2008-000762

(51) Int. Cl.
*G06F 3/048* (2013.01)
(52) U.S. Cl.
USPC ............ 715/790; 715/802; 715/764; 715/781
(58) Field of Classification Search
None
See application file for complete search history.

(56) References Cited

U.S. PATENT DOCUMENTS

| 5,377,317 | A | * | 12/1994 | Bates et al. ................... | 715/789 |
| 5,694,561 | A |   | 12/1997 | Malamud et al. | |
| 6,108,714 | A | * | 8/2000 | Kumagai et al. .............. | 719/310 |
| 6,239,796 | B1 | * | 5/2001 | Alexander .................... | 715/809 |
| 6,421,071 | B1 | * | 7/2002 | Harrison ...................... | 715/787 |
| 6,600,500 | B1 | * | 7/2003 | Yamamoto .................... | 715/795 |

(Continued)

FOREIGN PATENT DOCUMENTS

| JP | 05080968 | 4/1993 |
| JP | 05274106 | 10/1993 |

(Continued)

OTHER PUBLICATIONS

Dynamic Data Exchange and XITable Format, May 16, 2006.*

(Continued)

*Primary Examiner* — Matt Kim
*Assistant Examiner* — Mahelet Shiberou
(74) *Attorney, Agent, or Firm* — MKG, LLC (57) ABSTRACT

To simplify an operation for displaying or hiding windows, depending on a user or usage by the user. An information-processing device, according to the present invention, stores for each window, a time during which the window has been displayed together with another window (simultaneous display time), as a relevance table. The information-processing device, when receiving an instruction to display a window (subject window), refers to a relevance table for the subject window to identify a window whose simultaneous display time is the longest (simultaneous display window), and displays the subject window and the simultaneous display window. Also, the information-processing device, when receiving an instruction to hide a subject window, hides the subject window and a simultaneous display window.

14 Claims, 4 Drawing Sheets

(56) References Cited

U.S. PATENT DOCUMENTS

| | | | |
|---|---|---|---|
| 6,639,608 B1* | 10/2003 | Itakura | 715/738 |
| 7,257,777 B1* | 8/2007 | Kanevsky et al. | 715/794 |
| 8,055,655 B1* | 11/2011 | He et al. | 707/727 |
| 2002/0087403 A1* | 7/2002 | Meyers et al. | 705/14 |
| 2002/0135617 A1* | 9/2002 | Samid | 345/764 |
| 2006/0064442 A1* | 3/2006 | Nemoto | 707/202 |
| 2007/0124696 A1* | 5/2007 | Mullender et al. | 715/781 |
| 2007/0219935 A1* | 9/2007 | Surasinghe | 707/1 |
| 2008/0172617 A1* | 7/2008 | Takeda et al. | 715/733 |
| 2009/0055766 A1* | 2/2009 | Young et al. | 715/771 |
| 2009/0288036 A1* | 11/2009 | Osawa et al. | 715/794 |
| 2010/0057558 A1* | 3/2010 | Yano | 705/14.45 |
| 2011/0106963 A1* | 5/2011 | Lee et al. | 709/231 |

FOREIGN PATENT DOCUMENTS

| | | |
|---|---|---|
| JP | 10260810 | 9/1998 |
| JP | 11265246 | 9/1999 |
| JP | 2000293288 | 10/2000 |

OTHER PUBLICATIONS

European Application No. 08869280.1-2211; European Search Report Dated Oct. 24, 2011.

European Patent Application No. 08869280.1; Examination Report dated Dec. 21, 2011.

European Search Report dated Jun. 6, 2012; issued in conjunction with European Patent Application No. 12160292.4.

* cited by examiner

INFORMATION PROCESSING DEVICE AND PROGRAM FOR DISPLAY AND USE OF MULTIPLE WINDOWS

TECHNICAL FIELD

The present invention relates to a GUI (Graphical User Interface).

BACKGROUND

In a case where plural windows are displayed in a so-called multi-window system, windows displayed vary from user to user, or are dependent upon usage by a user. When plural windows are displayed simultaneously, a user has to perform certain operations to display or hide (or minimize) the windows. These operations become complicated, especially in a case where such operations are performed in a small information-processing device such as a mobile phone, and without the use of a pointing device such as a mouse.

JP10-260810A and JP5-274106 disclose a technique for controlling the display of plural windows. JP10-260810A discloses a technique for changing the arrangement of the windows displayed, on the basis of the number of transitions (movements of a focus) made among the windows. JP5-274106A discloses a technique of displaying, when plural windows are divided by a user into groups, and displaying of a window is instructed, windows belonging to a group identical to the window preferentially in front of windows belonging to other groups.

However, windows that can be simultaneously used are not limited to windows among which transitions can be made. Also, in a case where a display control is carried out on the basis of a pre-determined grouping, it is necessary to change the grouping in order to carry out another display control.

The present invention has been made in view of the above circumstances, and has an object of simplifying an operation for displaying or hiding windows, in accordance with a user or usage by the user.

A first information-processing device according to the present invention comprises: a control means for controlling display of a window on a display means, that corresponds to an application or a file; a measuring means for, if windows exist that are displayed on the display means together with a subject window corresponding to an application or a file, measuring a length or rate of time during which the subject window and each of the windows are simultaneously displayed; and a receiving means for receiving an instruction to start display of the subject window, and the control means, when the instruction is received by the receiving means, displays the subject window and a window whose length or rate of time measured by the measuring means is larger than other windows.

A second information-processing device according to the present invention comprises: a control means for controlling display of a window on a display means, that corresponds to an application or a file; a measuring means for, if windows exist that are displayed on the display means together with a subject window corresponding to an application or a file, measuring a length or rate of time during which the subject window and each of the windows are simultaneously displayed; and a receiving means for receiving an instruction to hide the subject window, or reduce a display size of the subject window to less than a prescribed size, and the control means, when the instruction is received by the receiving means, hides the subject window and a window whose length or rate of time measured by the measuring means is larger than other windows, or reduces sizes of the subject window and the window. ¥

A third information-processing device according to the present invention comprises: a control means for controlling display of a window on a display means, that corresponds to an application or a file; a measuring means for, if windows exist that provide data to a subject window that is displayed on the display means, the data being data determining content displayed in the subject window, measuring an amount of data exchanged between the subject window and each of the windows; and a receiving means for receiving an instruction to start display of the subject window, and the control means, when the instruction is received by the receiving means, displays the subject window and a window whose amount of data measured by the measuring means is larger than other windows.

A fourth information-processing device according to the present invention comprises: a control means for controlling display of a window on a display means, that corresponds to an application or a file; a measuring means for, if windows exist that provide data to a subject window that is displayed on the display means, the data being data determining content displayed in the subject window, measuring an amount of data exchanged between the subject window and each of the windows; and a receiving means for receiving an instruction to hide the subject window, or reduce a display size of the subject window to less than a prescribed size, and the control means, when the instruction is received by the receiving means, hides the subject window and a window whose amount of data measured by the measuring means is larger than other windows, or reduces sizes of the subject window and the window.

In the first or third formation-processing device according to the present invention, the control means, when the instruction is received by the receiving means, if an application corresponding to the subject window or the window has not been started, may start the application to display the corresponding window.

In the first or third formation-processing device according to the present invention, the receiving means may comprise a selection means for selecting an image displayed on the display means, and the control means may cause the display means to display a predetermined image, and if the image is selected by the selection means, display the subject window and the window.

In the second or fourth formation-processing device according to the present invention, the receiving means may comprise a selection means for selecting an image displayed on the display means, and the control means may cause the display means to display a predetermined image, and if the image is selected by the selection means, hide the subject window and the window, or reduces sizes of the windows.

The present invention may be defined as a program for causing a computer to realize functions of one of the first to fourth information-processing devices, or a recording medium such as an optical disk, that stores the program. Also, a program according to the present invention may be downloaded to a computer via a network such as the Internet, and installed therein so that the program can be used.

According to the present invention, display control for plural windows is carried out on the basis of a time during which plural windows are simultaneously displayed or on the basis of an amount of data exchanged between the plural windows, so that a window that is displayed (or hidden) together with another window changes in accordance with usage by a user. Namely, the present invention makes it possible to improve operability for a user.

DETAILED DESCRIPTION

Embodiments of the present invention will be described with reference to the drawings.

Figure 1:
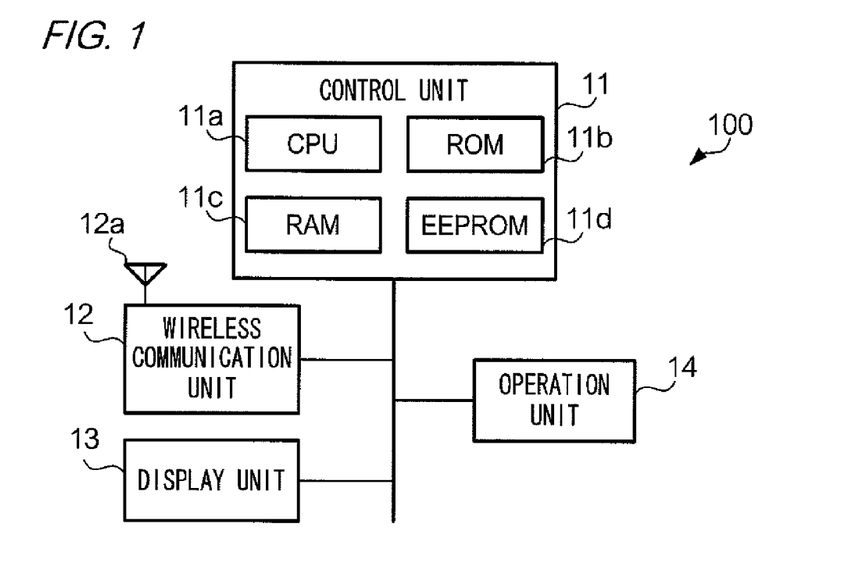
FIG. 1 is a block diagram showing a configuration of an information-processing device according to the present invention.

FIG. 1 is a block diagram illustrating a configuration of information-processing device 100 according to a first embodiment of the present invention. As shown in the drawing, information-processing device 100 comprises control unit 11, wireless communication unit 12, display unit 13, and operation unit 14. It is assumed that information processing unit 100 is a mobile phone with a unit for inputting and outputting voice (not shown) such as a microphone or a speaker.

Control unit 11 comprises CPU (Central Processing Unit) 11a, ROM (Read Only Memory) 11b, RAM (Random Access Memory) 11c, and EEPROM (Electronically Erasable and Programmable ROM) 11d. CPU 11a executes a program stored in ROM 11b or EEPROM 11d while using RAM 11c as a work area, to control components of information-processing device 100. Wireless communication unit 12 comprises antenna 12a, and wirelessly performs data communication with a predetermined mobile communication network. Display unit 13 has a liquid crystal display and a driving circuit, and displays an image in a predetermined display area on the basis of image data provided from control unit 11. Operation unit 14 comprises plural operation keys, and provides an operation signal corresponding to a user's operation, to control unit 11. A user is able to select a window or an image by operating the keys.

ROM 11b pre-stores programs. The programs will be hereinafter referred to as "preinstalled programs." Specifically, the preinstalled programs are a multitasking operating system (hereinafter referred to as "multitasking OS"), a Java (Registered Trademark) platform, and native applications. The multitasking OS is an operating system that supports functions such as allocation of virtual memory spaces, which are necessary to realize a pseudo-parallel execution of plural tasks using a TSS (Time-Sharing System). The Java platform is a bundle of programs that are described in accordance with a CDC (Connected Device Configuration), which is a configuration for providing Java execution environment 114 (described later) in information-processing device 100 having a multitasking OS. Native applications are programs for providing information-processing device 100 with basic functions such as voice communication.

EEPROM 11d comprises a Java application storage area for storing Java applications. A Java application consists of: a JAR (Java Archive) file including a main program, which is a sequence of instructions executed under a Java execution environment, and image files and audio files used when the main program is running; and an ADF (Application Descriptor File) in which information on installation and execution of the main program and attribute information of the main program are described. A Java application is created by a content provider or a carrier, and stored in a server. The Java application is downloaded from the server in response to a request from information-processing device 100.

Figure 2:
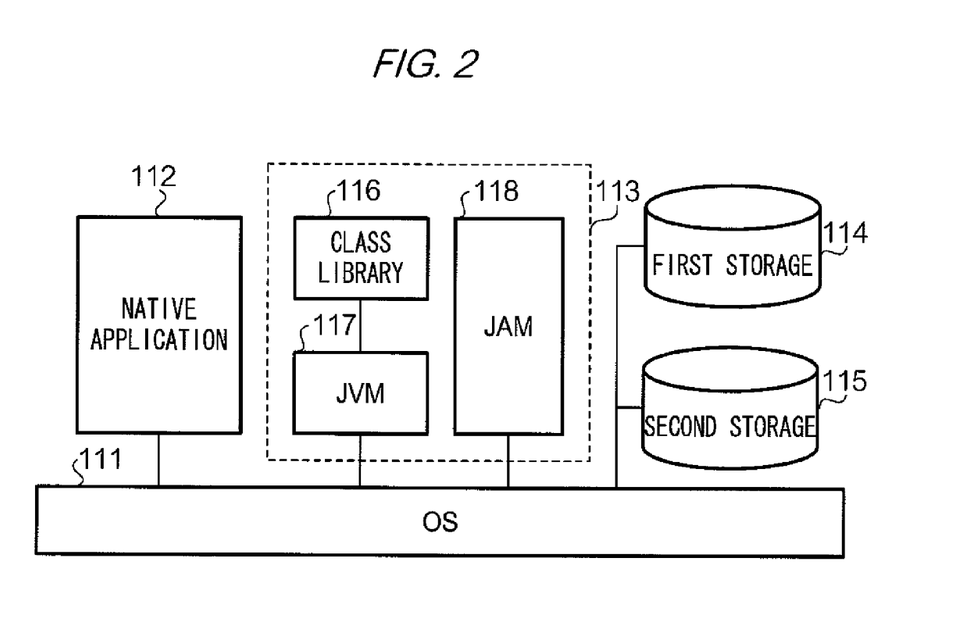
FIG. 2 is a diagram illustrating a logical configuration of an information-processing device.

FIG. 2 is a diagram illustrating a logical configuration of units provided in control unit 11 of information-processing device 100 through execution of programs stored in ROM 11b and EEPROM 11d. As shown in the drawing, in programs running in information-processing device 100, native application 112 and Java execution environment 113 are provided in OS 111. Also, first storage 114 and second storage 115 are secured in EEPROM 11d.

Java execution environment 113 is provided through execution of Java platform stored in ROM 11b. Java execution environment 113 comprises class library 116, JVM (Java Virtual Machine) 117, and JAM (Java Application Manager) 118. Class library 116 is a collection of program modules (classes), each of which provides a particular function. JVM 117 is a Java execution environment optimized for the CDC described above, and has a function of interpreting and executing bytecode provided as a Java application. JAM 118 has a function of managing download, installation, execution, or termination of a Java application.

First storage 114 is an area for storing Java applications (JAR files and ADFs) downloaded under control of JAM 118. Second storage 115 is an area for storing data that is generated during execution of a Java application after the program is terminated. A storage area of second storage 115 is assigned to each of the installed Java applications. Data of a storage area assigned to a Java application program can be rewritten during execution of the Java application, and cannot be rewritten during execution of another Java application.

The foregoing is a description of a configuration of information-processing device 100. Information-processing device 100 having the above-mentioned configuration executes plural applications in accordance with a request from a user or a status of the device. If a predetermined condition is satisfied, information-processing device 100 executes an application corresponding to the condition. For example, if an operation by a user is received via operation unit 14, information-processing device 100 executes an application (e.g., a native application or a Java application) corresponding to the operation. Alternatively, when a predetermined operation such as a call is terminated, information-processing device 100 executes a predetermined application.

Since information-processing device 100 employs a multi-window system, the device is able to simultaneously display plural windows. The plural windows may be windows, each of which corresponds to an application or windows, each of which corresponds to a file. Namely, information-processing device 100, by executing plural applications, displays windows, each of which corresponds to an application. Alternatively, information-processing device 100, by executing a single application, displays plural windows, each of which corresponds to one of the plural files.

It is to be noted that a "window" is a display area of display unit 13 that is assigned to an application.

Also, information-processing device 100 displays windows in an overlap window method. Accordingly, information-processing device 100 is able to select and move a window in accordance with an instruction from a user, or display plural windows so that they overlap each other.

Information-processing device 100 has a function of, when plural windows are simultaneously displayed, measuring a time during which a window is displayed together with a certain window. If it is determined that a window exists that is frequently displayed together with a certain window, on the basis of a measured display time, information-processing device 100 carries out display control so that the window and the certain window are simultaneously displayed. Specifically, the display control by information-processing device 100 is carried out as described below.

Figure 3:
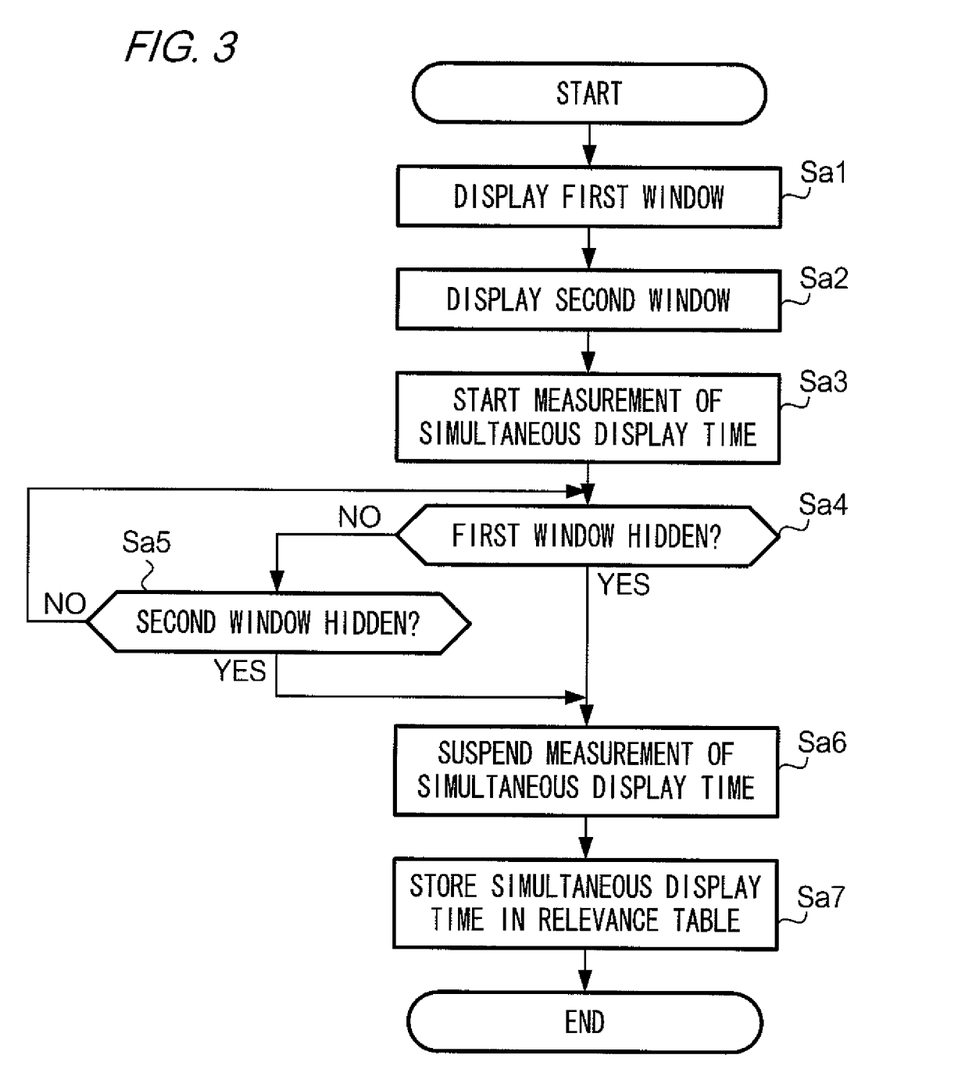
FIG. 3 is a flowchart showing an operation of an information-processing device.
Figure 4:
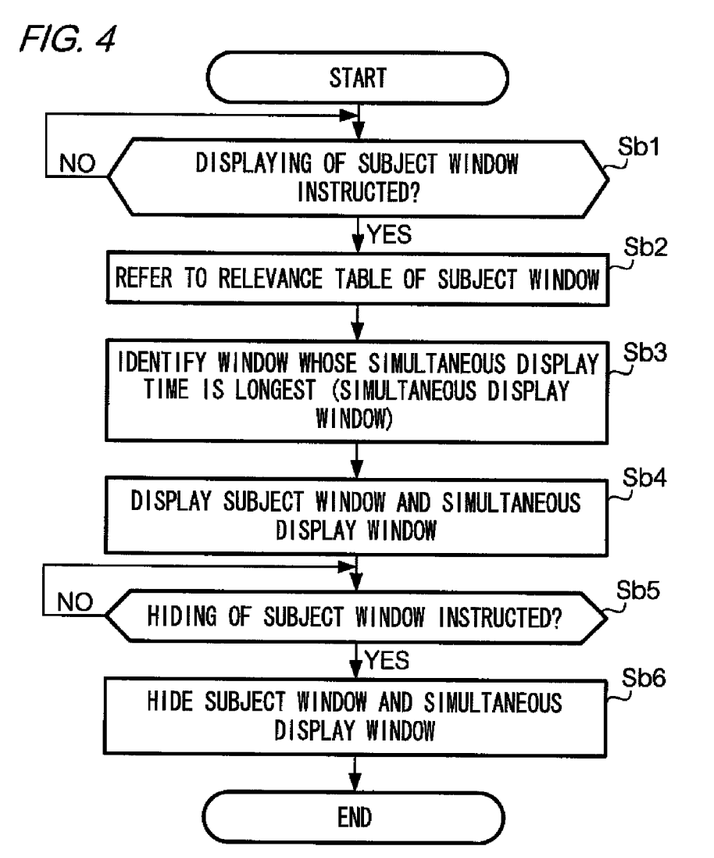
FIG. 4 is a flowchart showing an operation of an information-processing device.

FIGS. 3 and 4 are flowcharts showing an operation executed by control unit 11 of information-processing device 100. FIG. 3 is a flowchart showing a function of measuring a display time, and FIG. 4 is a flowchart showing a display control of windows that is performed on the basis of a measured display time.

As shown in FIG. 3, control unit 11 causes display unit 13 to display a certain window in response to an operation by a user (step Sa1). The window displayed will be hereinafter referred to as "first window." Thereafter, if displaying of another window, other than the first window, is instructed through an operation by a user, control unit 11 causes display unit 13 to display the other window (step Sa2). The other window displayed will be hereinafter referred to as "second window."

When the second window is displayed while the first window is also displayed, control unit 11 starts measuring a time during which the first window and the second window are simultaneously displayed, in response to displaying of the second window (step Sa3). The display time measured will be hereinafter referred to as "simultaneous display time." A simultaneous display time is a value accumulated for each set of windows that are simultaneously displayed.

Control unit 11, while measuring a simultaneous display time, repeatedly determines whether either of the first window and the second window has been hidden (steps Sa4 and Sa5). It is to be noted that a window is hidden when the window is closed or minimized. If the first window or the second window has been hidden, control unit 11 terminates measurement of a simultaneous display time (step Sa6). On the other hand, while both the first window and the second window are displayed, control unit 11 repeats determinations of steps Sa 4 and Sa5.

If control unit 11 terminates measurement of a simultaneous display time, control unit 11 stores the measured time (step Sa7). A collection of measured times stored by control unit 11 will be hereinafter referred to as "relevance table." The relevance table shows levels of association between windows.

Figure 5:
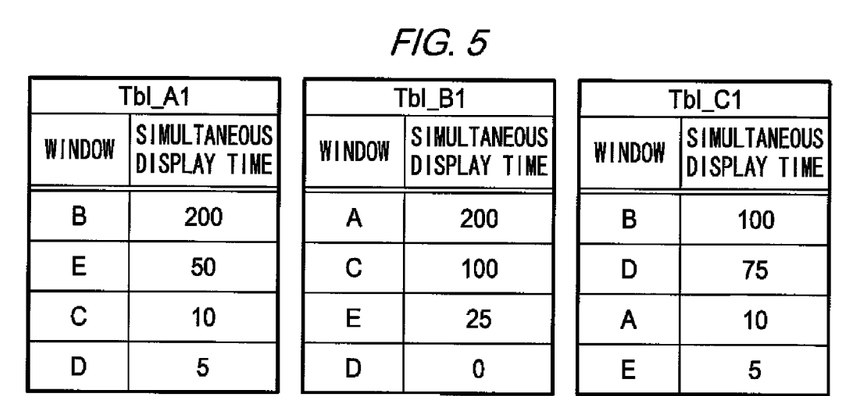
FIG. 5 is a diagram illustrating an example of relevance tables.

FIG. 5 is a diagram showing an example of relevance tables according to the present embodiment. As shown in the drawing, a relevance table is a table that describes, for a certain window, simultaneous display times of windows, during which time the windows are displayed together with the certain window. In the drawing, relevance tables Tbl_A1, Tbl_B1, and Tbl_C1 correspond to window A, window B, and window C, which are different windows, respectively. For example, relevance table Tbl_A1 shows that a simultaneous display time for window A and window B is "200," a simultaneous display time for window A and window E is "50," a simultaneous display time for window A and window C is "10," and a simultaneous display time for window A and window D is "5." A unit of a simultaneous display time may be arbitrarily determined.

The foregoing operation is carried out by control unit 11 each time a window is displayed.

Control unit 11 also performs, in parallel with the operation, an operation of determining a window, which should be displayed together with a window, displaying of which has been instructed, and if such a window exists, displaying the window together with another window, displaying of which has been instructed. The operation is shown in the flowchart of FIG. 4.

As shown in FIG. 4, control unit 11 determines whether an instruction to display a window has been received (step Sb1). The window, displaying of which has been instructed will be hereinafter referred to as "subject window." The determination of step Sb1 is repeated until an instruction to display a window is received.

If an instruction to display a subject window is received, control unit 11 identifies the subject window, and retrieves a relevance table relating to the subject window (step Sb2). Subsequently, control unit 11 identifies a window on the basis of the relevance table, whose simultaneous display time associated with the subject window is the longest (step Sb3). The window identified at step Sb3 will be hereinafter referred to as "simultaneous display window." For example, according to relevance table Tbl_A1 shown in FIG. 5, a window whose simultaneous display time associated with window A is the longest is "window B."

After identifying a simultaneous display window, control unit 11 causes display unit 13 to simultaneously display the subject window and the simultaneous display window (step Sb4). If an application corresponding to the subject window or the simultaneous display window has not been executed, control unit 11 executes the application and causes display unit 13 to display the corresponding window. After displaying the subject window and the simultaneous display window, control unit 11 determines whether an instruction to hide the subject window has been received (step Sb5). At step Sb5, hiding a window means closing or minimizing a window, as described above.

If an instruction to hide the subject window has been received, control unit 11 causes display unit 13 to hide the subject window and the simultaneous display window (step Sb6). After step Sb6 is performed, control unit 11 terminates display control of the subject window and the simultaneous display window.

As explained in the foregoing, information-processing device 100 according to the present embodiment, when starting display of a certain window, displays a window that has been displayed together with the certain window for a long period of time, together with the certain window. Windows that have been displayed together for a long period of time are highly likely to be a pair of windows that are simultaneously needed. Information-processing device 100 according to the present embodiment is able to display or hide such windows in accordance with a single instruction; therefore, as compared with a case where plural instructions are needed to perform such an operation, operability for a user is improved.

Also, since information-processing device 100 according to the present embodiment stores a simultaneous display time for each window, a window that is displayed together with a certain window changes depending on the usage by a user. For example, if a case frequently occurs in which windows A and B are simultaneously displayed, and displaying of window A is instructed, window B is displayed together with window A. However, thereafter, if a case in which windows A and C are simultaneously displayed frequently occurs rather than a case in which windows A and B are simultaneously displayed, and displaying of window A is instructed, window C is displayed together with window A. Namely, according to information-processing device 100, a user is able to display windows in accordance with usage by the user by a simple operation.

Windows that are appropriate for the operation of simultaneous displaying or hiding are, for example, windows for a standby application. A "standby application" is an application that displays a window that provides information or entertainment (displaying of a character) to a user while information-processing device 100 awaits an instruction from a user or a call (in a standby mode). For example, if a user uses a "launcher (an application for easily launching a frequently-used application by a simple operation)" and a "notepad (an application for displaying content input by a user)" as standby applications, windows corresponding to the applications are always displayed in a standby mode; namely, the applications are applications whose windows are simultaneously displayed for a long period of time. However, a "launcher" and a "notepad" are not applications between which transitions are frequently made by a user. Information-processing device 100 according to the present embodiment is able to simultaneously display or hide windows for such applications in accordance with a single operation.

A second embodiment of the present invention is a partially-modified version of the first embodiment described above. An information-processing device according to the present embodiment has a function of measuring an amount of data exchanged between a window and another window, and identifies a window that should be displayed or hidden together with another window, on the basis of the measured amount of data. It is to be noted that in the following description of the present embodiment, description will be made mainly with regard to differences from the first embodiment described above, and description with regard to components similar to those of the first embodiment will be omitted. Like signs are provided for similar components.

Information-processing device 100 according to the present embodiment, if there is a window that is displayed together with another window, and when the window is displayed, obtains data indicative of content displayed in the other window to update content displayed in the window, simultaneously displays or hides the two windows. Also, information-processing device 100, if there are plural windows that exchange data with each other, carries out display control so that a window, whose amount of data exchanged is larger, is given high priority.

Figure 6:
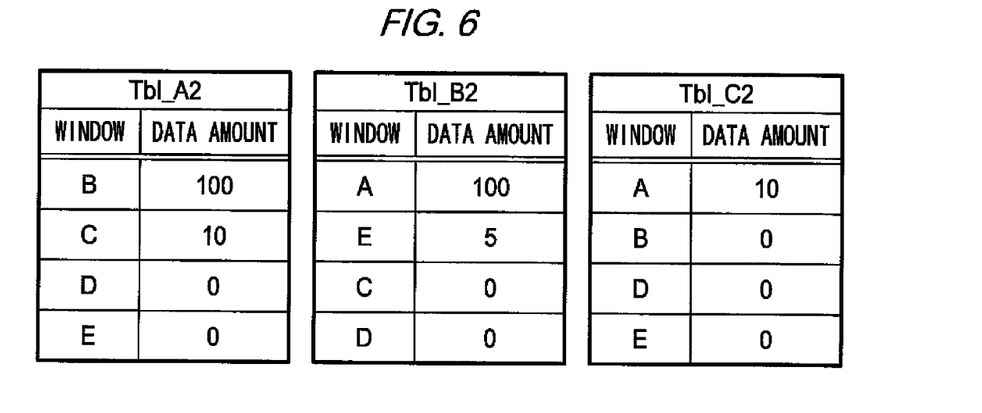
FIG. 6 is a diagram illustrating an example of relevance tables.

FIG. 6 is a diagram showing an example of relevance tables according to the present embodiment. In the relevance tables according to the present embodiment, "exchanged data amounts," which indicate an amount of data exchanged, are stored, instead of "simultaneous display times" of the first embodiment. For example, relevance table Tbl_A2 shows that an exchanged data amount for window A and window B is "100," an exchanged data amount for window A and window C is "10," and an exchanged data amount for window A and window D or E is "0." A unit of an exchanged data amount may be arbitrarily determined.

Figure 7:
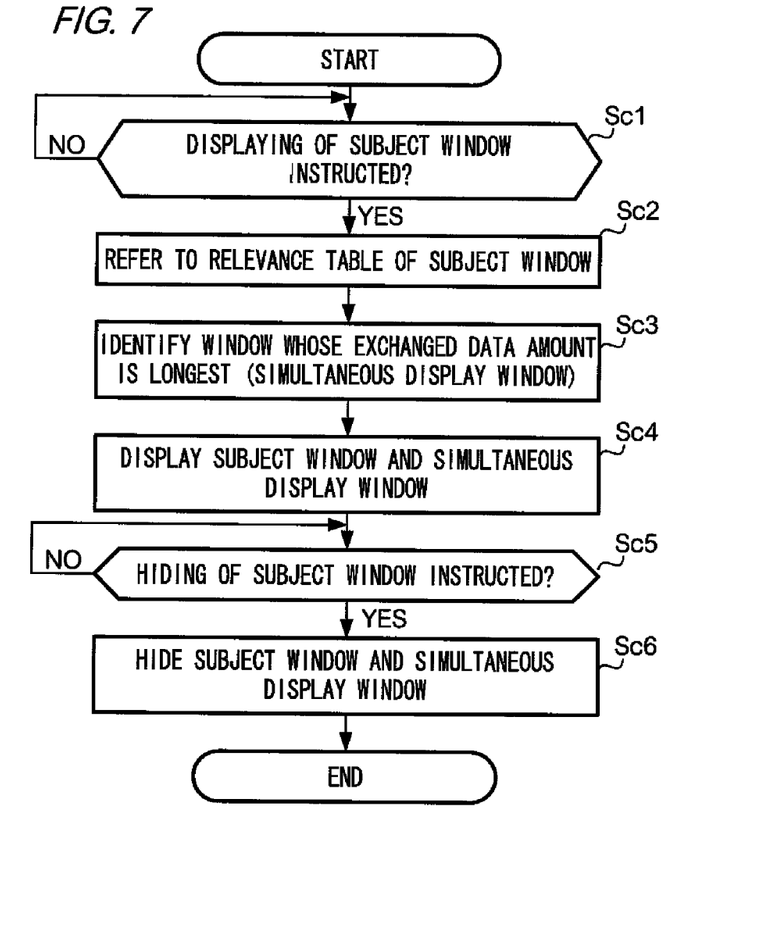
FIG. 7 is a flowchart showing an operation of an information-processing device.

FIG. 7 is a flowchart showing an operation of display control for windows based on measured exchanged data amounts.

As shown in the drawing, control unit 11 determines whether an instruction to display a subject window has been received (step Sc1). If an instruction to display a subject window has been received, control unit 11 identifies the subject window, and retrieves a relevance table corresponding to the subject window (step Sc2). Subsequently, control unit 11 identifies a window on the basis of the relevance table, whose exchanged data amount relative to the subject window is the largest (step Sc3). The window determined at the step will be referred to as "simultaneous display window."

After identifying a simultaneous display window, control unit 11 causes display unit 13 to simultaneously display the subject window and the simultaneous display window (step Sc4). After the subject window and the simultaneous display window are displayed, control unit 11 determines whether an instruction to hide the subject window has been received (step Sc5). If an instruction to hide the subject window has been received, control unit 11 causes display unit 13 to hide the subject window and the simultaneous display window (step Sc6), and terminates display control for the windows.

As described in the foregoing, information-processing device 100 according to the present embodiment, when starting display of a certain window, if there is a window that displays content on the basis of content displayed in the certain window, simultaneously displays the two windows. Such windows may include a pair of windows corresponding to an application for displaying a map of each area, and a window corresponding to an application for obtaining data indicative of an area displayed from the map-displaying application, and displaying a weather report on the area. A pair of applications that exchange data on displayed content with each other are highly likely to be a pair of applications that are simultaneously needed. Information-processing device 100 according to the present embodiment is able to display or hide such windows in accordance with a single instruction; therefore, as compared with a case where plural instructions are needed to perform such an operation, operability for a user is improved.

The present invention may be implemented in an embodiment different from the above embodiments. For example, the present invention may be implemented in the embodiments described below. It is to be noted that the following modifications may be combined with each other.

(1) Modification 1

A method for identifying a simultaneous display window is not limited to the method employed in the above embodiments. For example, plural, simultaneous display windows may be identified. If plural, simultaneous display windows are identified, windows may be identified in descending order of a value of simultaneous display time or exchanged data amount. Alternatively, windows may be identified whose value of simultaneous display time or exchanged data amount exceeds a predetermined threshold value.

In the first embodiment, instead of a window whose simultaneous display time is the longest, a window whose rate of time during which simultaneous display has been performed is the largest, may be identified. A "rate" is expressed in a formula "$t_{A+B}/t_A+t_{A+B}$," wherein a time during which windows A and B are simultaneously displayed is $t_{A+B}$, and a time during which window A is displayed but window B is not displayed is $t_A$. The rate may be expressed in a formula "$t_{A+B}/t_A+t_B+t_{A+B}$," wherein a time during which window B is displayed but window A is not displayed is $t_B$.

(2) Modification 2

A subject window and a simultaneous display window do not necessarily need to be simultaneously displayed. For example, control unit 11 may display the windows at slightly different times.

Control unit 11, when displaying a subject window and a simultaneous display window, may adjust display positions of the windows. For example, control unit 11 may adjust positions of a subject window and a simultaneous display window so that they are displayed adjacent to each other; consequently, the subject window and the simultaneous display window can be easily viewed at the same time. Alternatively, control unit 11 may adjust positions of a subject window and a simultaneous display window so that they do not overlap each other; consequently, the entire subject window and the entire simultaneous display window can be displayed.

(3) Modification 3

In the above embodiments, an operation for displaying a subject window and a simultaneous display window (step Sb4 or Sc4) is carried out regardless of whether the windows have been opened. However, control unit 11 may carry out the operation only when a subject window or a simultaneous display window is open, or only when a subject window or a simultaneous display window is not open.

An operation to "open" a window is an operation to start an application that has not yet been activated, or reference a file that has not yet been referred to, so that a window is opened. Namely, control unit 11, when opening a new window, carries out an operation for starting a new application that has not yet been activated, or for referencing a file that has not yet been referred to. An operation to make a hidden window reappear in a case where after an application is started, a corresponding window is displayed, and the window has been hidden because the window has been minimized or another window has been displayed on top, is not included in an operation to "open" a window.

(4) Modification 4

In the above embodiments, a subject window and a simultaneous display window are simultaneously displayed, and simultaneously hidden. However, the present invention may be applied to only a case of displaying (or hiding).

(5) Modification 5

An instruction to hide a window includes an instruction directly given by a user and an instruction given when a window (other than a subject window and a simultaneous display window) is displayed. For example, in a case where a certain window is displayed on top of a subject window or a simultaneous display window, the subject window and the simultaneous display window are hidden. Accordingly, in this case, an instruction to display the certain window on top can be said to be an instruction to hide the subject window and the simultaneous display window.

(6) Modification 6

A method for hiding a window includes closing a corresponding application, and minimizing the window. When a window is minimized, instead of the window that is hidden, an image such as an icon representing a situation where an application corresponding to the window is not closed, may be displayed. The image may be an image that represents an instruction to make the hidden window reappear in response to a selection made by a user.

Control unit 11 may, instead of hiding a subject window and a simultaneous display window, reduce the sizes of the windows. Specifically, control unit 11, when receiving an instruction from a user, may carry out control for reducing a ratio of a display area of display unit 13, occupied by a subject window and a simultaneous display window. For example, control unit 11 may reduce sizes of the windows to less than a prescribed size.

(7) Modification 7

Control unit 11, when a set of windows exists whose simultaneous display time or exchanged data amount is larger than those of other windows, may cause display unit 13 to display an image such as an icon or a button, representing an instruction to display all relevant windows. The image may be displayed in a window of the launcher described above. Control unit 11, when the image is selected by a user, displays all windows corresponding to the instruction represented by the image.

Alternatively, control unit 11 may display an image that represents an instruction to hide all relevant windows. The image may be displayed in a part of a window. For example, if a window is rectangle-shaped, the image may be displayed in a corner of the window.

(8) Modification 8

In the above embodiments, the present invention has been applied to a mobile phone; however, the present invention may be applied to other information-processing devices. The present invention may be applied to various information-processing devices such as a communication terminal including a PDA (Personal Digital Assistance), a camera, a portable music player, a portable game device. It is to be noted that an information-processing device according to the present invention may lack a multitasking feature.

What is claimed:

1. An information-processing device comprising:
a control means for controlling display of at least one window on a display means, wherein each window corresponds to an application or a file;
a measuring means for measuring a length of time of simultaneous display of two windows, wherein:
the measuring means measures a first length of time of first simultaneous display of a first window and a second window;
the first simultaneous display occurs when the first window is displayed while the second window is displayed, or when the second window is displayed while the first window is displayed;
the measuring of the first length of time begins upon the first simultaneous display;
the measuring means measures a second length of time of second simultaneous display of the first window and a third window;
the second simultaneous display occurs when the first window is displayed while the third window is displayed, or when the third window is displayed while the first window is displayed; and
the measuring of the second length of time begins upon the second simultaneous display;
a storage control means for storing data in a table, wherein:
the storage control means stores in the table, data on the first length of time in association with the first window and the second window; and
the storage control means stores in the table, data on the second length of time in association with the first window and the third window;
a receiving means for receiving an instruction to start display of the first window in a situation where the first to third windows are not displayed; and
an identifying means, when the instruction is received by the receiving means, for comparing the first length of time associated with the first window in the table and the second length of time associated with the first window in the table to identify either the second or third window which is associated with a longer length of time in the table, or for comparing a rate calculated based on the first length of time and a rate calculated based on the second length of time to identify either the second or third window which is associated in the table with a length of time based on which a larger rate is calculated, wherein the control means displays the first window and the window identified by the identifying means.

2. An information-processing device comprising:
a control means for controlling display of at least one window on a display means, wherein each window corresponds to an application or a file;

a measuring means for measuring a length of time of simultaneous display of two windows, wherein:
the measuring means measures a first length of time of first simultaneous display of a first window and a second window;
the first simultaneous display occurs when the first window is displayed while the second window is displayed, or when the second window is displayed while the first window is displayed;
the measuring of the first length of time begins upon the first simultaneous display;
the measuring means measures a second length of time of second simultaneous display of the first window and a third window;
the second simultaneous display occurs when the first window is displayed while the third window is displayed, or when the third window is displayed while the first window is displayed; and
the measuring of the second length of time begins upon the second simultaneous display;
a storage control means for storing data in a table, wherein:
the storage control means stores in the table, data on the first length of time in association with the first window and the second window; and
the storage control means stores in the table, data on the second length of time in association with the first window and the third window;
a receiving means for receiving an instruction to hide the first window, or reduce a display size of the first window to less than a prescribed size in a situation where the first to third windows are displayed; and
an identifying means, when the instruction is received by the receiving means, for comparing the first length of time associated with the first window in the table and the second length of time associated with the first window in the table to identify either the second or third window which is associated with a longer length of time in the table, or for comparing a rate calculated based on the first length of time and a rate calculated based on the second length of time to identify either the second or third window which is associated in the table with a length of time based on which a larger rate is calculated, wherein the control means hides or reduces sizes of the first window and the window identified by the identifying means.

3. An information-processing device comprising:
a control means for controlling display of at least one window on a display means, wherein each window corresponds to an application or a file;
a measuring means for measuring an amount of data exchanged between two windows displayed on the display means, wherein:
the measuring means measures a first amount of data exchanged between a first window and a second window; and
the measuring means measures a second amount of data exchanged between the first window and a third window;
a storage control means for storing data in a table, wherein:
the storage control means stores in the table, data on the first amount of data in association with the first window and the second window; and
the storage control means stores in the table, data on the second amount of data in association with the first window and the third window;

a receiving means for receiving an instruction to start display of the first window in a situation where the first to third windows are not displayed; and
an identifying means for, when the instruction is received by the receiving means, comparing the first amount of data associated with the first window in the table and the second amount of data associated with the first window in the table to identify either the second or third window which is associated with a larger amount of data in the table, wherein the control means displays the first window and the window identified by the identifying means.

4. An information-processing device comprising:
a control means for controlling display of a window on a display means, wherein each window corresponds to an application or a file;
a measuring means for measuring an amount of data exchanged between two windows displayed on the display means, wherein:
the measuring means measures a first amount of data exchanged between a first window and a second window; and
the measuring means measures a second amount of data exchanged between the first window and a third window;
a storage control means for storing data in a table, wherein:
the storage control means stores in the table, data on the first amount of data in association with the first window and the second window; and
the storage control means stores in the table, data on the second amount of data in association with the first window and the third window;
a receiving means for receiving an instruction to hide the first window, or reduce a display size of the first window to less than a prescribed size in a situation where the first to third windows are displayed; and
an identifying means for, when the instruction is received by the receiving means, comparing the first amount of data associated with the first window in the table and the second amount of data associated with the first window in the table to identify either the second or third window which is associated with a larger amount of data in the table, wherein the control means hides the first window and the window identified by the identifying means.

5. An information-processing device according to claim 1, wherein the control means, if an application corresponding to the first window or the window identified by the identifying means has not been started, starts the application to display the corresponding window.

6. An information-processing device according to claim 3, wherein the control means, if an application corresponding to the first window or the window identified by the identifying means has not been started, starts the application to display the corresponding window.

7. An information-processing device according to claim 1, wherein:
the receiving means comprises a selection means for selecting an image displayed on the display means; and
the control means causes the display means to display a predetermined image, and if the image is selected by the selection means, displays the first window and the another window.

8. An information-processing device according to claim 3, wherein:
the receiving means comprises a selection means for selecting an image displayed on the display means; and
the control means causes the display means to display a predetermined image, and if the image is selected by the selection means, displays the first window and the window identified by the identifying means.

9. An information-processing device according to claim 2, wherein:
the receiving means comprises a selection means for selecting an image displayed on the display means; and
the control means causes the display means to display a predetermined image, and if the image is selected by the selection means, hides the first window and the window identified by the identifying means, or reduces sizes of the first window and the window identified by the identifying means.

10. An information-processing device according to claim 4, wherein:
the receiving means comprises a selection means for selecting an image displayed on the display means; and
the control means causes the display means to display a predetermined image, and if the image is selected by the selection means, hides the first window and the window identified by the identifying means, or reduces sizes of the first window and the window identified by the identifying means.

11. A non-transitory computer-readable medium with a program for causing a computer to execute the steps of:
controlling display of at least one window on a display means, wherein each window corresponds to an application or a file;
displaying a first window, a second window, and a third window on the display means;
measuring a first length of time of first simultaneous display of the first window and the second window, wherein the first simultaneous display occurs when the first window is displayed while the second window is displayed, or when the second window is displayed while the first window is displayed, and the measuring of the first length of time begins upon the first simultaneous display;
measuring a second length of time of second simultaneous display of the first window and the third window, wherein the second simultaneous display occurs when the first window is displayed while the third window is displayed, or when the third window is displayed while the first window is displayed, and the measuring of the second length of time begins upon the second simultaneous display;
storing, in a table, data on the first length of time in association with the first window and the second window;
storing, in the table, data on the second length of time in association with the first window and the third window;
receiving an instruction to start display of the first window in a situation where the first to third windows are not displayed; and
when the instruction is received, comparing the first length of time associated with the first window in the table and the second length of time associated with the first window in the table to identify either the second or third window which is associated with a longer length of time in the table, or comparing a rate calculated based on the first length of time and a rate calculated based on the second length of time to identify either the second or third window which is associated in the table with a length of time based on which a larger rate is calculated; and
displaying the first window and the identified window.

12. A non-transitory computer-readable medium with a program for causing a computer to execute the steps of:
controlling display of at least one window on a display means, wherein each window corresponds to an application or a file;
displaying a first window, a second window, and a third window on the display means;
measuring a first length of time of first simultaneous display of the first window and the second window, wherein the first simultaneous display occurs when the first window is displayed while the second window is displayed, or when the second window is displayed while the first window is displayed, and the measuring of the first length of time begins upon the first simultaneous display;
measuring a second length of time of second simultaneous display of the first window and the third window, wherein the second simultaneous display occurs when the first window is displayed while the third window is displayed, or when the third window is displayed while the first window is displayed, and the measuring of the second length of time begins upon the second simultaneous display;
storing, in a table, data on the first length of time in association with the first window and the second window;
storing, in the table, data on the second length of time in association with the first window and the third window;
receiving an instruction to hide the first window, or reduce a display size of the first window to less than a prescribed size in a situation where the first to third windows are displayed; and
when the instruction is received, comparing the first length of time associated with the first window in the table and the second length of time associated with the first window in the table to identify either the second or third window which is associated with a longer length of time in the table, or comparing a rate calculated based on the first length of time and a rate calculated based on the second length of time to identify either the second or third window which is associated in the table with a length of time based on which a larger rate is calculated; and
hiding or reducing sizes of the first window and the identified window.

13. A non-transitory computer readable medium with a program for causing a computer to execute the steps of:
controlling display of at least one window on a display means, wherein each window corresponds to an application or a file;
measuring a first amount of data exchanged between a first window and a second window, which are displayed on the display means;
measuring a second amount of data exchanged between the first window and a third window, which are displayed on the display means;
storing, in a table, data on the first amount of data in association with the first window and the second window;
storing, in the table, data on the second amount of data in association with the first window and the third window;
receiving an instruction to start display of the first window in a situation where the first to third windows are not displayed;
when the instruction is received, comparing the first amount of data associated with the first window in the table and the second amount of data associated with the first window in the table to identify either the second or third window which is associated with a larger amount of data in the table; and
displaying the first window and the identified window.

14. A non-transitory computer readable medium with a program for causing a computer to execute the steps of:
controlling display of a window on a display means, wherein each window corresponds to an application or a file;
measuring a first amount of data exchanged between a first window and a second window, which are displayed on the display means;
measuring a second amount of data exchanged between the first window and a third window, which are displayed on the display means;
storing, in a table, data on the first amount of data in association with the first window and the second window;
storing, in the table, data on the second amount of data in association with the first window and the third window;
receiving an instruction to hide the first window, or reduce a display size of the first window to less than a prescribed size in a situation where the first to third windows are displayed;
when the instruction is received, comparing the first amount of data associated with the first window in the table and the second amount of data associated with the first window in the table to identify either the second or third window which is associated with a larger amount of data in the table; and
hiding the first window and the identified window.

* * * * *